(12) United States Patent
D'Sidocky et al.

(10) Patent No.: US 9,701,081 B2
(45) Date of Patent: Jul. 11, 2017

(54) METHOD FOR FORMING STRATIFIED RUBBER ARTICLE WITH VARIABLE CURE RATE

(75) Inventors: Richard Michael D'Sidocky, Ravenna, OH (US); Rebecca Lee Dando, Uniontown, OH (US); Gary Robert Burg, Massillon, OH (US); Neil Phillip Stuber, Munroe Falls, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1501 days.

(21) Appl. No.: 12/950,403

(22) Filed: Nov. 19, 2010

(65) Prior Publication Data

US 2011/0146888 A1 Jun. 23, 2011

Related U.S. Application Data

(60) Provisional application No. 61/289,679, filed on Dec. 23, 2009.

(51) Int. Cl.
*B29D 30/62* (2006.01)
*B29D 30/16* (2006.01)
(Continued)

(52) U.S. Cl.
CPC ............... *B29D 30/16* (2013.01); *B29B 7/38* (2013.01); *B29C 47/1063* (2013.01); *B29C 47/1081* (2013.01); *B29C 47/364* (2013.01); *B29C 47/385* (2013.01); *B29C 47/822* (2013.01); *B29C 47/92* (2013.01); *B29D 30/30* (2013.01); *B29D 30/62* (2013.01);
(Continued)

(58) Field of Classification Search
CPC ......... B29D 30/52; B29D 30/58; B29D 30/60
USPC ............... 156/117, 128.1, 397; 152/209.5; 425/209, 224, 376.1, 382.3
See application file for complete search history.

(56) References Cited

U.S. PATENT DOCUMENTS 6,808,579 B1 10/2004 Pulford et al.
7,354,188 B2 * 4/2008 Uphus et al. ................ 366/77
(Continued)

FOREIGN PATENT DOCUMENTS

EP 0485127 * 5/1992 ............. B29B 11/04
EP 0919406 * 6/1999 ............... B60C 9/02
(Continued)

OTHER PUBLICATIONS

Machine-generated English language translation of EP 1033234 (original document dated Sep. 2000).*
(Continued)

*Primary Examiner* — Martin Rogers
(74) *Attorney, Agent, or Firm* — June E. Rickey (57) ABSTRACT

A method of forming a tread comprising two or more layers of rubber is described. The method includes the steps of: extruding a rubber compound through an extruder and a gear pump and mixing with an accelerant and then applying a continuous strip of rubber directly onto a tire building machine to form a first layer of rubber having a first cure rate; adjusting the amount of accelerant to obtain a second cure rate different than said first cure rate, and then applying a strip of rubber having a second cure rate onto the tire building machine, wherein one of the cure rates is faster than the other cure rate.

1 Claim, 5 Drawing Sheets (51) Int. Cl.
 *B29B 7/38* (2006.01)
 *B29C 47/10* (2006.01)
 *B29C 47/36* (2006.01)
 *B29C 47/92* (2006.01)
 *B29D 30/30* (2006.01)
 *B29C 47/38* (2006.01)
 *B29C 47/82* (2006.01)
 *B29C 47/00* (2006.01)
 *B29K 21/00* (2006.01)
 *B29K 105/00* (2006.01)
 *B29L 30/00* (2006.01)
 *B29L 31/00* (2006.01)
 *B29C 47/06* (2006.01)

(52) U.S. Cl.
 CPC ...... *B29C 47/0021* (2013.01); *B29C 47/0023* (2013.01); *B29C 47/0057* (2013.01); *B29C 47/062* (2013.01); *B29C 47/367* (2013.01); *B29C 2947/926* (2013.01); *B29C 2947/9258* (2013.01); *B29C 2947/92561* (2013.01); *B29C 2947/92657* (2013.01); *B29C 2947/92695* (2013.01); *B29C 2947/92704* (2013.01); *B29C 2947/92952* (2013.01); *B29K 2021/00* (2013.01); *B29K 2105/0005* (2013.01); *B29L 2030/00* (2013.01); *B29L 2031/7102* (2013.01)

(56) References Cited

U.S. PATENT DOCUMENTS

| | | |
|---|---|---|
| 2005/0186301 A1 | 8/2005 | Koumo et al. ............... 425/143 |
| 2006/0241213 A1* | 10/2006 | Galimberti et al. .......... 523/351 |
| 2009/0080282 A1* | 3/2009 | Skibba ....................... 366/76.2 |
| 2011/0146883 A1 | 6/2011 | Burg |
| 2011/0146884 A1 | 6/2011 | Burg et al. |
| 2011/0146888 A1 | 6/2011 | D'Sidocky et al. |

FOREIGN PATENT DOCUMENTS

| | | | | |
|---|---|---|---|---|
| EP | 0928680 | * | 7/1999 | ............ B29D 30/16 |
| EP | 1033234 | * | 9/2000 | ............ B29D 30/06 |
| JP | 2000 043032 A | | 2/2000 | |
| JP | 2000043032 A | | 2/2000 | |
| WO | 2004/007172 A1 | | 1/2004 | |

OTHER PUBLICATIONS

Natuurrubber 38 Rubber technology part 3, Compounding Newsletter of the Rubber Foundation Information Center for Nautral Rubber McDougal, 2005.*
European Search Report, dated Apr. 6, 2011.
European Search Report, dated Apr. 19, 2011.
U.S. Appl. No. 13/175,030, filed Jul. 1, 2011.
U.S. Appl. No. 13/181,773, filed Jul. 13, 2011.

* cited by examiner

FIG-7

METHOD FOR FORMING STRATIFIED RUBBER ARTICLE WITH VARIABLE CURE RATE

CROSS REFERENCE TO OTHER APPLICATIONS

This application claims the benefit of and incorporates by reference U.S. Provisional Application No. 61/289,679 filed Dec. 23, 2009.

FIELD OF THE INVENTION

The invention relates in general to tire manufacturing, and more particularly to continuous production of custom rubber mixtures.

BACKGROUND OF THE INVENTION

It is increasingly desired to get better tire performance, in particular, lower rolling resistance. In general it is known that the property of lower rolling resistance occurs with lower cure temperatures. The disadvantage to lower cure temperatures is that the mold time is increased, resulting in a lower productivity. One solution may be to utilize faster cure packages in order to eliminate the time penalty from the lower cure temperatures. However, the use of faster cure packages in rubber has proven to be difficult, typically resulting in scorch of the compound undergoing processing in the Banbury mixers.

Thus an improved method and apparatus is desired which substantially reduces the need for the use of Banbury mixers while providing an apparatus and methodology to provide custom mixing at the tire building machine by blending of two or more compounds together, and controlling the ratio of the compounds and other additives. Both non-productive compounds and productive compounds could be blended together. It is further desired to have a system at the tire building machine which provides for the ability to manufacture customizable compounds with accelerators. Yet an additional problem to be solved is to generate the compounds continuously at the tire building machine.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

"Productive compound" means a rubber compound that includes accelerators, sulfur and other materials needed to cure the rubber.

"Non-productive compound" means a rubber compound that does not have one or more of the following items: 1) accelerator; 2) sulfur; or 3) curing agent(s).

BRIEF DESCRIPTION OF THE DRAWINGS

The invention will be described by way of example and with reference to the accompanying drawings in which.

DETAILED DESCRIPTION OF THE INVENTION

Figure 1:
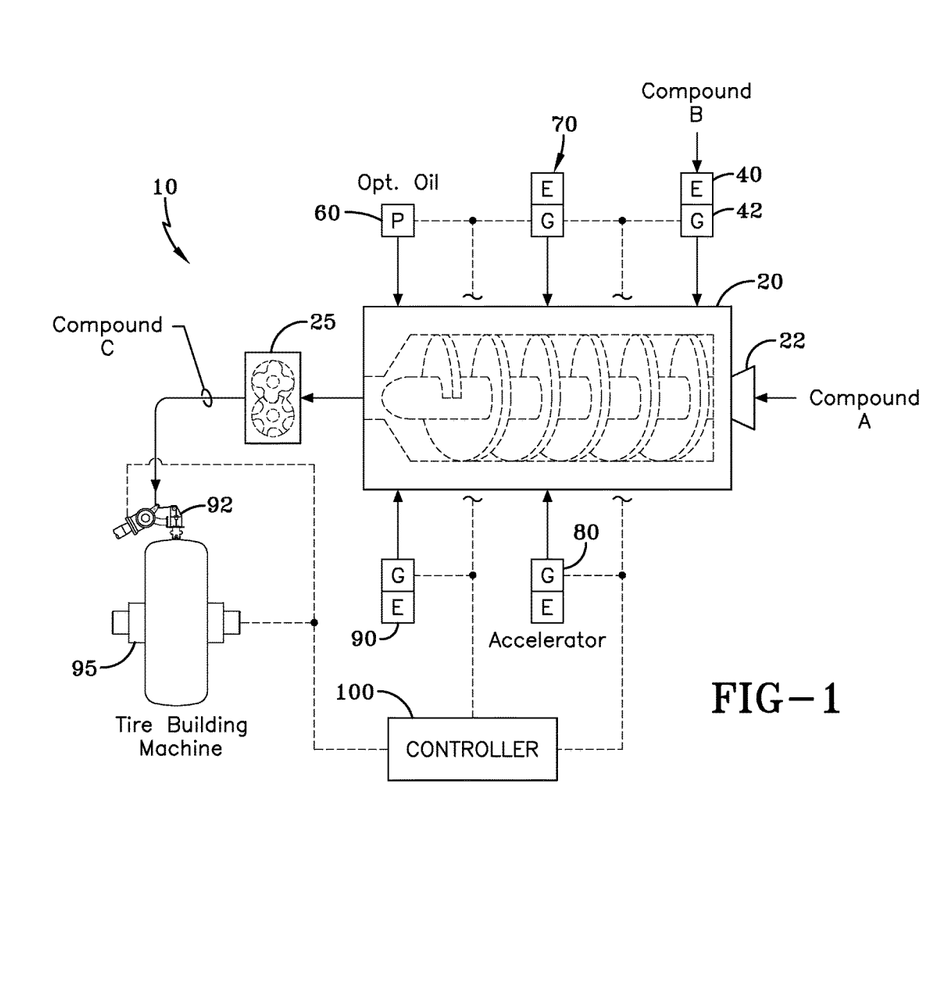
FIG. 1 is a schematic of a mixing system of the present invention.

FIG. 1 illustrates a first embodiment of a method and apparatus 10 for a continuous mixing system suitable for use for making rubber compositions for tires or tire components. The continuous mixing system is not limited to tire applications and may be used for example, to make other rubber components not related to tires such as conveyors, hoses, belts, etc. The mixing system may be provided directly at the tire building machinery for direct application of the rubber composition to a tire building drum or other tire building apparatus with the advantage of a short residence time.

FIG. 1 illustrates a continuous mixing apparatus 10 of the invention which includes a main extruder 20. The extruder 20 has an inlet 22 for receiving a first compound A, which may be a productive or non-productive rubber composition, or plastic composition. The extruder may comprise any commercial extruder suitable for processing of rubber or elastomer compounds. The extruder may comprise a commercially available extruder commonly known by those skilled in the art as a pin type extruder, a twin screw or a single screw extruder, or a ring type of extruder. One commercially available extruder suitable for use is a multi-cut transfermix (MCT) extruder, sold by VMI Holland BV, The Netherlands. Preferably, the extruder has an L/D of about 8, but may range from about 5 to about 25, preferably 10-15. A ring type, pin type or MCT type of extruder is preferred, but is not limited to same. The extruder functions to warm up the compound A to the temperature in the range of about 80° C. to about 150° C., preferably about 90° C. to about 120° C., and to masticate the rubber composition as needed.

Compound B may also comprise a productive or non-productive rubber composition or plastic composition. Examples of compound B compositions are described in more detail, below. Compound B is first extruded by second extruder 40 and a second gear pump 42. The extruder 40 may be a conventional pin type, ring type, dual screw or single screw type extruder. The gear pump 42 functions as a metering device and a pump and may have gears such as planetary gears, bevel gears or other gears. The extruder 40 and gear pump 42 may also be a combination unit.

Compound B is output from the gear pump 42 in a controlled amount and fed into a pin hole of main extruder 20. Compound A and compound B are blended together in a precisely controlled amount. Oil may be optionally injected into main extruder 20 via an oil pump 60. The oil controls the viscosity of the compound mixture.

The apparatus 10 may further include a first additive pump 70 for pumping one or more additives such as a primary accelerator, which may be optionally added to the mixture at the main extruder 20 or a main gear pump 25. The apparatus may further include a second additive pump 80 for pumping one or more additives such as a secondary accelerator into the main extruder 20 or in the main gear pump 25. The apparatus may further include a third additive pump 90 for pumping one or more additives such as a third accelerator into the main extruder 20 or in the main gear pump 25. The additive pumps 70, 80, 90 may be gear pumps, gear pump extruders, or venturi pumps, or other pumping devices known to those skilled in the art.

If more than one accelerator is used, they may be added into the mixture separately or together. For example, a primary accelerator and a secondary accelerator may both be added. Accelerators are used to control the time and/or temperature required for vulcanization and to improve the properties of the rubber. The accelerator may be in powder form or an encapsulated powder into a resin or rubber base. Examples of accelerator compositions are described in more detail, below.

Other additives include a curative agent or precursor, which may also be added to the mixer via additive pump 90. One example of a curative agent is sulfur. The sulfur may be added in solid form.

Thus the apparatus of the invention produces an output mixture of compound C which is a precise mixture of the A and B compound, optional oil and optional accelerant and optional additives. The output mixture of compound C exits the main extruder 20 and enters a main gear pump 25. The main gear pump 25 is preferably located adjacent a tire building station 95 for direct application onto a core, tire blank buffed carcass for a retreaded tire or tire building drum 95, as shown in FIG. 1. Gear pump 25 preferably has a nozzle 92 which applies the compound formulation output from the gear pump 25 directly onto the tire building machine 95 in strips which are wound onto a tire building drum or core.

Figure 2:
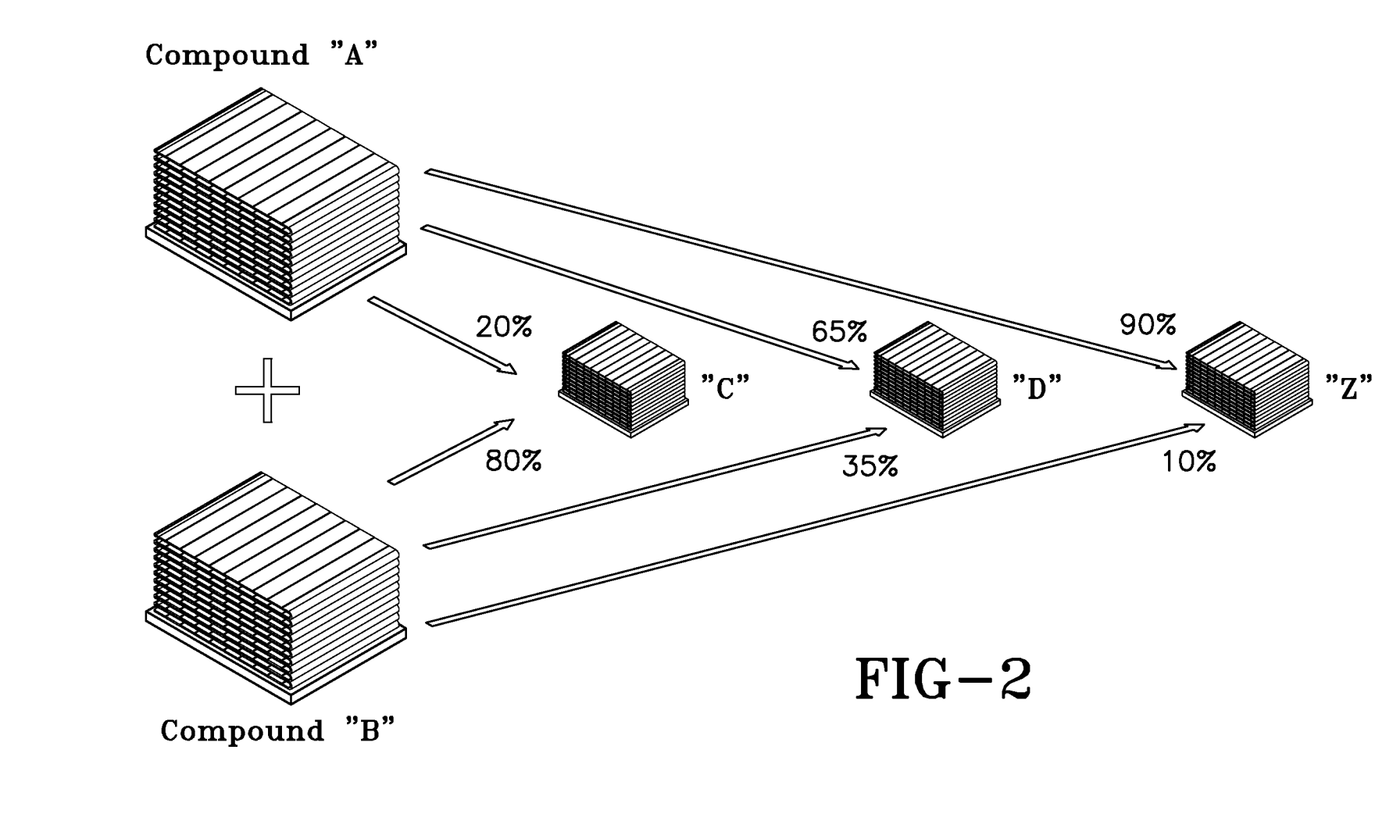
FIGS. 2 and 3 illustrate exemplary output from the mixing system.

The ratio of the volumetric flow rate of compound A to the volumetric flow rate of compound B is precisely controlled by a computer controller 100 which controls the ratio of the speed of the gear pump 25 for compound A and the speed of gear pump 42 for compound B. For example, the compound output from the system 10 may comprise a ratio of 20% of compound A and 80% of compound B by volume, as shown in FIG. 2. Alternatively, the compound output from the system may comprise a mixture D having a ratio of 35% of compound B and 65% of compound A by volume. Alternatively, the compound output from the system may comprise a mixture Z having a ratio of 10% of compound B and 90% of compound A by volume. The ratio of compound A to compound B can thus range from 0:100% to 100%:0. The ratio may be adjusted instantaneously by varying the speeds of gear pumps 25 and 42. The computer controller 100 may additionally control the extruder and gear pump operating parameters such as operating pressure, operating temperature, pump or screw speed.

Figure 3:
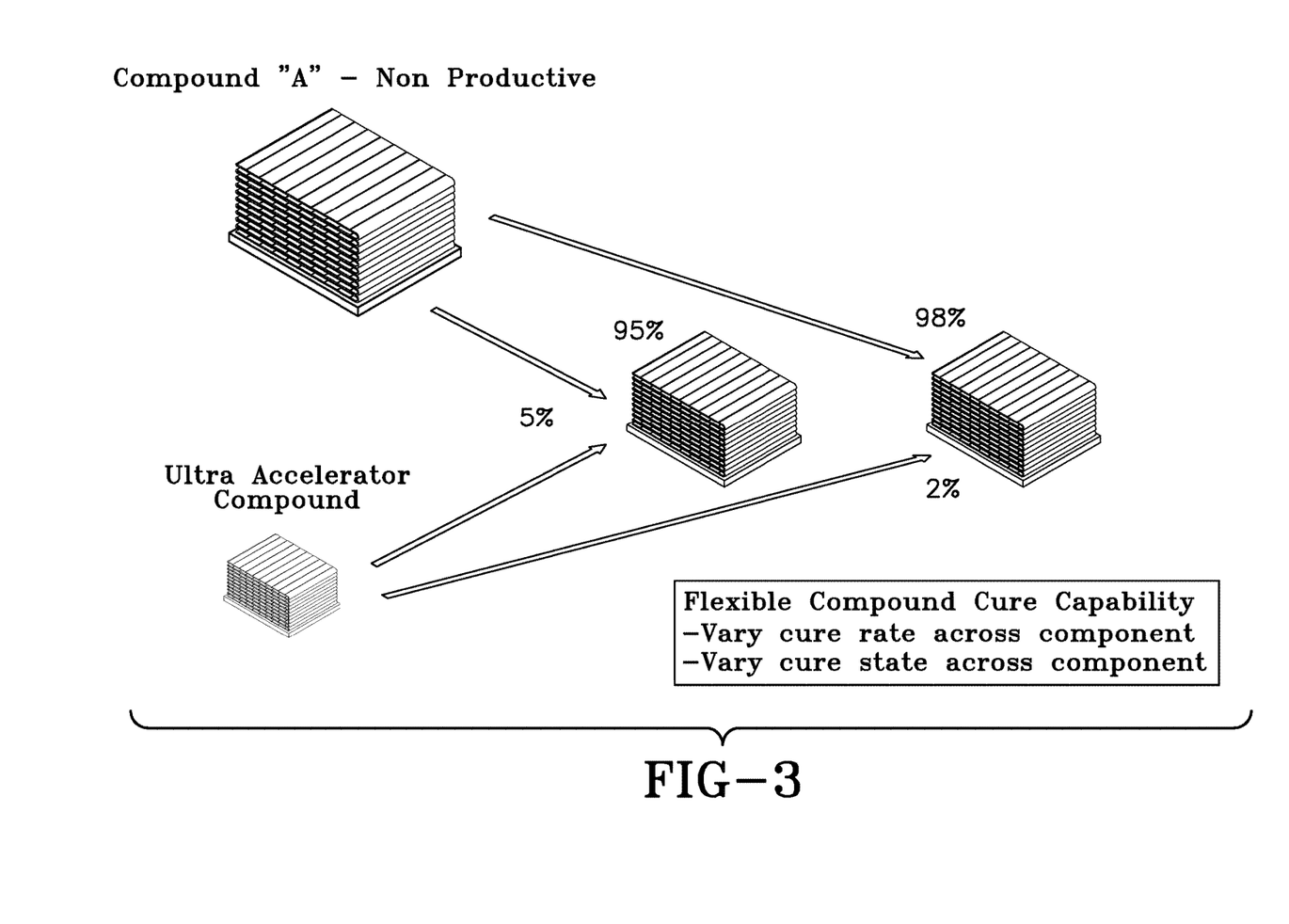

The computer controller may also be used to control the cure rate of the compound. For example, the additive pump 70 may be used to mix in a primary accelerator with the mixture of compound A and compound B. See for example, FIG. 3. The amount of accelerator may be controlled by the computer controller. A secondary accelerator may also be added to the mixture of compound A and compound B via additive pump 80. The amount of the primary and secondary accelerators may be adjusted instantaneously by controlling the speed of the pumps via controller.

Preferably, the computer controller 100 sets a pressure target value for the exit pressure of each extruder. The extruder speed is controlled by the controller, and is varied until the pressure target is met. The pressure target value affects the quality of mixing by causing backflow of the material in the extruder.

Figure 4:
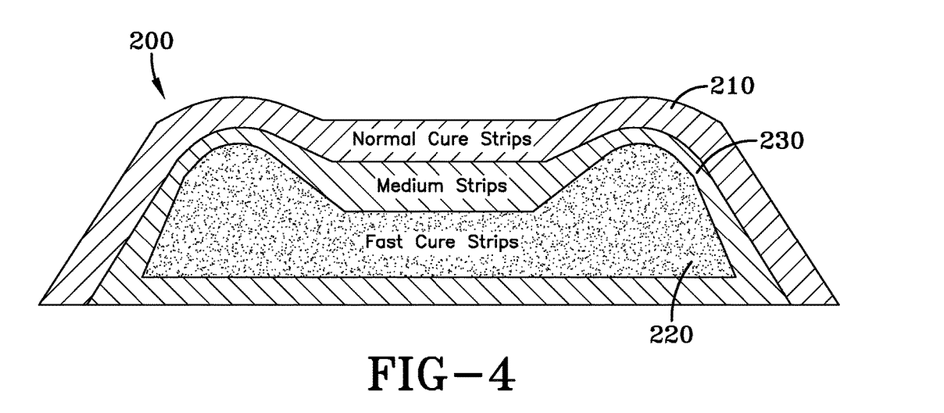
FIG. 4 illustrates a cross-sectional profile of a tread of the present invention.

In a first example of the invention, a stratified tread 200 is formed having a cross-sectional profile as shown in FIG. 4. The stratified tread is comprised of three or more layers, wherein each layer has a different cure rate. The radially outermost layer 210 is preferably formed of a tread compound which is mixed with an accelerant via additive pump 70 in a sufficient amount to have a first cure rate.

The radially innermost layer 220 is formed of a tread compound which may be the same or different than the compound of the outermost layer 210. A primary accelerator is added to the mixture via gear pump/extruder 70 in a sufficient amount to have a faster cure rate relative to the cure rate of the radially outermost layer 210. The cure rate of the radially innermost layer 220 is preferably 30-40% faster than the radially outermost layer 210. A secondary accelerator may also be utilized in conjunction with the primary accelerator to produce the desired cure rate.

An optional middle layer 230 is formed between the radially outer layer and the radially inner layer. The middle layer is formed of a desired compound which has a faster cure rate relative to the cure rate of the radially outermost layer 210, but slower than the radially innermost layer 220.

The cure rate of the middle layer 230 is preferably 10-30% faster than the radially outermost layer 210. A secondary accelerator may also be utilized in conjunction with the primary accelerator to produce the desired cure rate.

Thus the exemplary tread of FIG. 4 may be formed of the same compound and have a cure rate which varies in the radial direction. The tread is not limited to same, and may comprise one or more tread compounds which have a cure rate which varies in the axial direction. The tread may also comprise a configuration which has a cure rate which varies in both the radial direction and the axial direction.

Figure 5:
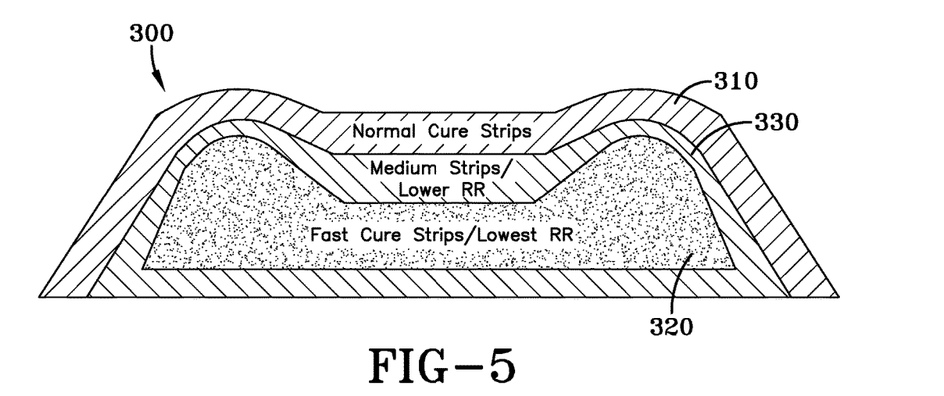
FIG. 5 illustrates a second embodiment of a cross-sectional profile of a tread of the present invention.

In a second example of the invention, a stratified tread 300 is formed having a cross-sectional profile as shown in FIG. 5. The stratified tread is comprised of three or more layers. The radially outermost layer 310 is preferably formed of a tread compound (compound A) that has high wear resistance. High wear resistant tread compounds tend to be stiff compounds, with high fillers. An accelerant is added to the mixture via gear pump/extruder 70 in a sufficient amount to have a desired cure rate.

The radially innermost layer 320 is preferably formed of a compound having low or ultra low rolling resistance (compound B). The radially innermost layer 320 may be formed of 100% compound B. Compounds that have low rolling resistance are generally soft compounds with low fillers. Low rolling resistance compounds tend to have a high wear rate. A primary accelerator is added to the mixture via gear pump/extruder 70 in a sufficient amount to have a faster cure rate relative to the cure rate of the radially outermost layer 310. The cure rate of the radially innermost layer 320 is preferably 30-40% faster than the radially outermost layer 310. A secondary accelerator may also be utilized in conjunction with the primary accelerator to produce the desired cure rate.

An optional middle layer 330 is formed between the radially outer layer and the radially inner layer. The middle layer 330 is preferably formed of a blend of the compound selected for the radially outermost layer 310 (compound A) and the radially innermost layer 320 (compound B). The blend ratio may vary as desired in the range of 10%-90% compound A, to 90%-10% compound B. A primary accelerator is added to the mixture via additive pump 70 in a sufficient amount to have a faster cure rate relative to the cure rate of the radially outermost layer 310, but slower than the radially innermost layer 320. The cure rate of the middle layer 330 is preferably 10-30% faster than the radially outermost layer 310. A secondary accelerator may also be utilized in conjunction with the primary accelerator to produce the desired cure rate.

The cure rate of each layer may be varied by varying the amount of the accelerator, or through the use of a primary and secondary accelerator in combination. The cure rate may also be varied by changing the composition or type of accelerators utilized per layer.

In order to form the tread, a first layer of compound A is extruded onto a form or tire building machine. The tread may be extruded in strips onto the tire building machine. The mixing system of FIG. 1 may be utilized, with the desired compound A and the amount of desired accelerant selected being fed into the extruder 20. The compound A exits the gear pump 25 and is fed onto tire building drum 95 via nozzle 92. The compound A is extruded onto the tire drum in the desired profile.

In order to form the middle layer 230, compound A is blended with compound B in the amount desired along with the desired amount of primary and/or secondary accelerator. After the desired blend ratio is selected, the compound A is blended with compound B using the speed ratio of the gear pumps to get the precise mixture ratio. The blend is then extruded onto the tire building drum in the desired profile.

Next, the outer layer is formed by extruding compound B onto the tire building drum over the middle layer in the desired profile. The outer layer may also be a blend of compound A with compound B to arrive at the desired properties.

Figure 7:
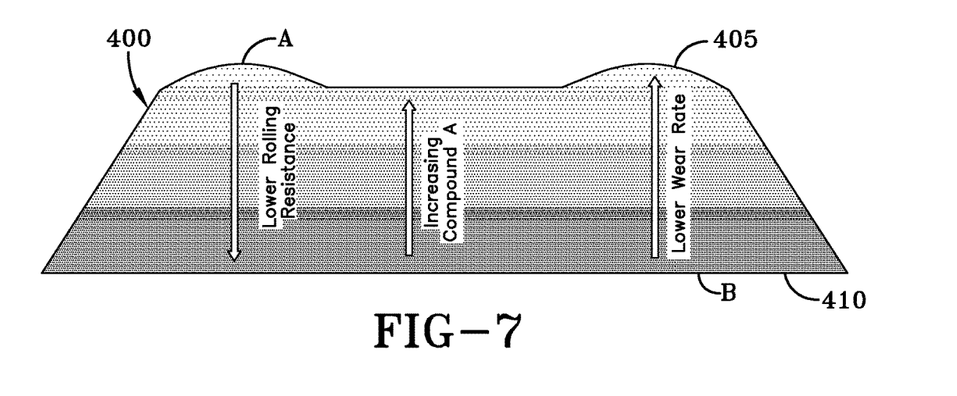
FIG. 7 illustrates a third embodiment of a continuously stratified tread of the present invention.

FIG. 7 illustrates a third embodiment of a stratified tread profile 400. The tread varies in both compound composition and cure rate in the radial direction. The radially outer surface 405 is formed of 100% of compound A and has a first cure rate. In this example, compound A is selected to have high wear resistance. High wear resistant tread compounds tend to be stiff compounds, with high fillers. The radially innermost layer 410 is formed of compound B. Compound B is selected to have low rolling resistance properties, although other compound properties may be selected. The radially innermost layer also has the fastest cure rate. The tread further comprises multiple middle layers which progressively vary in the composition of compound A to compound B, increasing in the amount of compound A and decreasing in the amount of compound B as the layers progress radially outward. The multiple middle layers also progressively vary in the cure rate, varying from the fastest cure rate at the radially innermost layer and being progressively slower as the layers progress radially outward.

Figure 6:
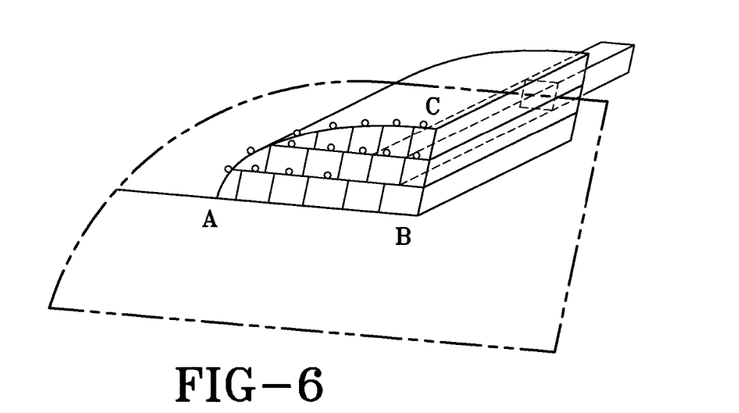
FIG. 6 is a schematic illustrating the tread broken down into grid points.

To form the tread, the mixing system of FIG. 1 may be utilized, with the desired compound A being fed into the extruder 20. The computer controller 100 also controls the amount of primary accelerant added to the mixture via gear pump 70 in order to produce a first cure rate. The output mixture exits the gear pump 25 and is fed onto tire building drum 95 via nozzle 92 and is extruded onto the tire drum in a first layer. A second layer is then extruded over the first layer, as shown in FIG. 6. The second layer is formed of a blend of compound A and compound B. In one example, the second layer may be formed of 10% compound A with 90% compound B. The computer controller of the mixing system adjusts the speed of each gear pump 25, 42 to control the output mixture to have 10% compound A with 90% compound B. The computer controller also controls the amount of primary accelerant added to the mixture via gear pump 70 in order to produce a second cure rate which is different than said first rate, and preferably faster. A third layer is then extruded over the first layer. The third layer may comprise 20% compound A with 80% compound B and have a third cure rate which is different than said first or second rate, and is preferably even faster. A fourth layer may then be extruded over the third layer, and having a 30-70 ratio, and having a fourth cure rate which is different than said first or second rate, and is preferably even faster. The process may be repeated until the outer layer is formed from 100% compound A.

The blend ratios of the above example may be varied as desired and are not limited to same. While the example has varied the composition of the rubber and the cure rate in the radial direction, the invention is not limited to same. The composition of the rubber may be varied in the axial direction, and also in combination with the radial direction. The cure rate of the rubber compound may also be varied in the axial direction, and also in combination with the radial direction. The tread may also be formed by varying the composition or blend ratio of the rubber mixture in the axial direction. The tread may also be formed by varying the composition or blend ratio of the rubber mixture in both the axial and radial direction as desired. FIG. 5 illustrates a portion of the tread profile broken into small increments. Once the ideal tread profile has been designed, the tread profile is broken down into small incremental blocks A, B, C, and the desired blend ratio and cure rate is selected for each incremental block. Utilizing the computer control, one or more strips having the desired blend ratio and cure rate may be applied to the tire building drum. The blend ratio may vary in the radial direction, the axial direction, or both directions as desired.

The following are exemplary compositions which may be used in conjunction with the invention.

I. Accelerator Compositions

In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanized rubber. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

II. Rubber Compositions

Representative rubbers that may be used in the rubber compound include acrylonitrile/diene copolymers, natural rubber, halogenated butyl rubber, butyl rubber, cis-1,4-polyisoprene, styrene-butadiene copolymers, cis-1,4-polybutadiene, styrene-isoprene-butadiene terpolymers ethylene-propylene terpolymers, also known as ethylene/propylene/diene monomer (EPDM), and in particular ethylene/propylene/dicyclopentadiene terpolymers. Mixtures of the above rubbers may be used. Each rubber layer may be comprised of the same rubber composition or alternating layers may be of different rubber composition.

The rubber compound may contain a platy filler. Representative examples of platy fillers include talc, clay, mica and mixture thereof. When used, the amount of platy filler ranges from about 25 to 150 parts per 100 parts by weight of rubber (hereinafter referred to as phr). Preferably, the level of platy filler in the rubber compound ranges from about 30 to about 75 phr.

The various rubber compositions may be compounded with conventional rubber compounding ingredients. Conventional ingredients commonly used include carbon black, silica, coupling agents, tackifier resins, processing aids, antioxidants, antiozonants, stearic acid, activators, waxes, oils, sulfur vulcanizing agents and peptizing agents. As known to those skilled in the art, depending on the desired degree of abrasion resistance, and other properties, certain additives mentioned above are commonly used in conventional amounts. Typical additions of carbon black comprise from about 10 to 150 parts by weight of rubber, preferably 50 to 100 phr. Typical amounts of silica range from 10 to 250 parts by weight, preferably 30 to 80 parts by weight and blends of silica and carbon black are also included. Typical amounts of tackifier resins comprise from about 2 to 10 phr. Typical amounts of processing aids comprise 1 to 5 phr. Typical amounts of antioxidants comprise 1 to 10 phr. Typical amounts of antiozonants comprise 1 to 10 phr. Typical amounts of stearic acid comprise 0.50 to about 3 phr. Typical amounts of accelerators comprise 1 to 5 phr. Typical amounts of waxes comprise 1 to 5 phr. Typical amounts of oils comprise 2 to 30 phr. Sulfur vulcanizing agents, such as elemental sulfur, amine disulfides, polymeric polysulfides, sulfur olefin adducts, and mixtures thereof, are used in an amount ranging from about 0.2 to 8 phr. Typical amounts of peptizers comprise from about 0.1 to 1 phr.

III. Oil

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of forming a tread comprising two or more layers of rubber, the method comprising the steps of:
   extruding a rubber compound through a first extruder and a first gear pump;
   extruding an accelerant through a second extruder and a second gear pump and then into the first extruder for mixing the rubber compound with the accelerant, and then applying one or more first strips of a rubber mixture having a first cure rate from the output of the first gear pump directly onto a tire building machine;
   adjusting the amount of accelerant to obtain a second cure rate different than said first cure rate, and then applying one or more second strips of rubber mixture having a second cure rate directly onto the tire building machine, wherein one of the cure rates is faster than the other cure rate.

* * * * *